Jan. 13, 1931. D. D. PAYNE 1,789,081
METHOD OF MAKING MOTTLED CELLULOSE ESTER PLASTIC
BODIES AND THE PRODUCT THEREOF
Filed March 17, 1928

D. D. Payne, Inventor

By his attorney
Harold G. Kingsbury

Patented Jan. 13, 1931

1,789,081

UNITED STATES PATENT OFFICE

DANIEL D. PAYNE, OF LEOMINSTER, MASSACHUSETTS, ASSIGNOR TO DU PONT VISCOLOID COMPANY, OF WILMINGTON, DELAWARE, A CORPORATION OF DELAWARE

METHOD OF MAKING MOTTLED CELLULOSE ESTER PLASTIC BODIES AND THE PRODUCT THEREOF

Application filed March 17, 1928. Serial No. 262,549.

This invention relates to the making of decorative bodies, particularly rods, of cellulose ester plastic. While not confined thereto, the invention has particularly valuable application in the making of pyroxylin plastic rods, such, for example, as are used in the production of fountain pen barrels, etc. In particular, the invention has to do with rods which have a mottled design, such rods also desirably embodying corpuscular pigments, such as "pearl essence", the method providing for not only the production and exact control of the mottle, but also providing for the proper orientation of the corpuscular pigment simultaneously with the production and control of the mottle.

It has heretofore been attempted to produce mottled goods by merely extruding as a unit a bundle of assembled masses of variously colored pyroxlyin plastic, but it has not been found feasible, and indeed hardly possible, to control the mottle in such extruding operations. Also, it has previously been attempted to cut rods from sheet stock containing corpuscular pigment particles, but the difficulty is that with sheet stock, made either by casting, or by sheeting from a cake-pressed block, the pigment particles are all oriented in a single direction or plane, this plane lying parallel to the top and bottom of the sheet; so that rods cut from this sheet, although they displayed properly oriented particles and lustre on their top and bottom surfaces due to the particles being viewed on their "flats", would be entirely devoid of lustre on the sides of the rod because of the particles being viewed on their edges.

I have devised a method whereby plastic rods, with their mottles accurately controlled and closely corresponding with the desired design, and with all longitudinal surfaces of the rods showing a high lustre, due to the corpuscular pigment being properly oriented, may be readily and inexpensively produced. It is a major object of the invention to provide a method such as that indicated, and the product thereof. To this end, and also to improve generally upon methods and products of the character indicated, the invention consists in the various matters hereinafter described and claimed.

Figure 1:
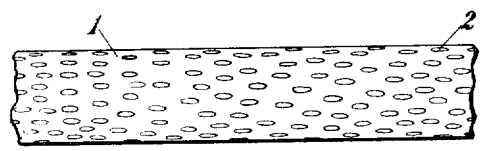
Figure 2:
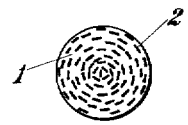
Figure 3:
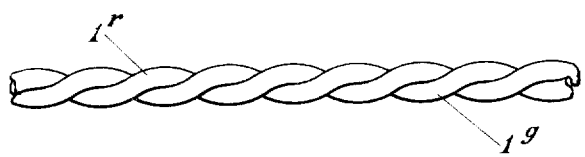
Figure 4:
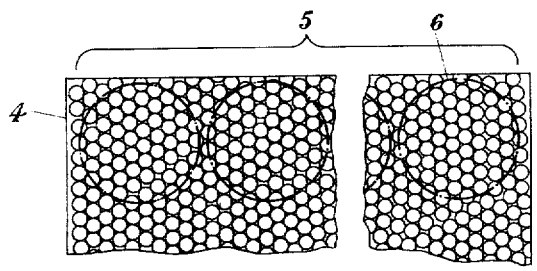
Figure 5:
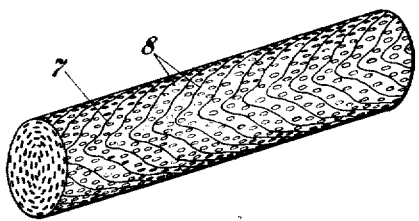

In the accompanying drawings, the figures are elementary and diagrammatic, and with the showing of the particles of corpuscular pigment greatly exaggerated. Figure 1 is a side view of a portion of an extruded unit or string. Figure 2 is an end view of the unit shown in Figure 1. Figure 3 is a view of two units twisted together into a bundle for introduction into the cake-press. Figure 4 is a fragmental, broken out end view of the bundles assembled in the cake-press with the knives with which the press-cake will ultimately be cut into rods indicated by phantom lines, no attempt being made in the figure to show the manner in which each of the units of a bundle, and also each of the bundles, becomes closely united, and welded, each with the other in the cake-press. Figure 5 is a perspective view of a finished rod. The various figures are, of course, of different scales.

In general accordance with the invention, the same may be practised as follows, it being understood that the detailed description is given by way of example rather than by way of limitation. The plastic used may be of any desired character as one comprising (parts by weight) pyroxylin 100, camphor 35, urea 1, denatured alcohol 60, color pigment 1, and pearl essence 2, the volatile solvent content being such as the plastic contains upon discharge from the vacuum mixer, wherein the final mixing is done, the color and corpuscular pigments added, and part of the initial volatile solvent removed. (If preferred, the color pigment may be omitted and the extruded plastic units mentioned below dipped in dye solution which will, of course, penetrate the stock more or less deeply from the circumference inward depending upon time of immersion, etc.)

Any desired number of batches of plastic, such as that above indicated, and each batch (say two) colored with a distinctive color, one being, say, red, and the other green, are introduced into the separate stuffing machines, and the plastic extruded. The diameter of the extruding orifices may be as desired, but for a considerable variety of work, I have found that strings or rods from 1/64 inch to 1 inch in diameter are desirable. As a result of this operation, there are produced strings, rods or units 1 of indefinite length, and each of a distinct color, as two strings 1$^r$ and 1$^s$. As will be understood by those familiar with the stuffing of plastic containing corpuscular pigment particles, such as pearl essence, each of the strings has all of its particles 2 oriented in the direction of the length of the rod as shown in Figure 1 and arranged in whorls about the axis of the rod as shown in Figure 2, so that the entire outer surface of the rod (except, of course, the ends), and any surface formed by cutting longitudinally of the rod, has a proper lustre due to the pearl essence particles being viewed on their "flats" instead of on their edges, this being particularly true when the rods are extruded round.

Second. The above rods, in any desired number and in any desired number of colors (including white, black and transparent), are assembled together in bundles as shown in Figure 3, which may be done by laying the rods parallel, or braiding them together as shown, or in any other desired manner, depending upon and corresponding to the particular mottle desired. It is particularly desirable to twist or braid the rods together, as by doing this, when the rods have somewhat hardened they will remain assembled together in the bundle, eliminating the necessity for using extraneous means for holding the units of the bundles together.

Third. A number of the above bundles sufficient to fill the chase of a cake-press, and each desirably of a length to extend the length of the chase in the direction of travel of the cutting knife, are now laid in the press. In cases where the pearl essence is omitted, so that the problem of preserving the proper orientation of the particles of this material is not present, the bundles may be laid in the chase either crosswise of the direction of travel of the knife which will ultimately be used to divide the finished cake, or may be laid parallel with, or at any angle to, the direction of travel of the knife, depending upon the character of mottle desired. But in cases, as that particularly described above, wherein the plastic contains pearl essence, or the like, it is necessary that the bundles be laid other than directly crosswise to the direction of travel of the knife. They may be laid at any angle other than directly crosswise and valuable orientation effects produced, but for maximum results they should be laid parallel to the line of travel, in order that, when the finished cake is divided, the corpuscular particles will lie parallel, and extend in the same direction as, the exposed longitudinal surface (or surfaces) of the cake division.

Fourth. The bundles, assembled as above described, are now submitted to the cake-pressing operation in the usual way. That is to say, the press is closed and a hydraulic pressure of, say, 3000 pounds per square inch, is applied to the plastic, the plastic being "worked" by the application of heat and cold, in the well-understood manner, until the plastic units forming the cake 4 are directly united together, after which the carrier plate, with the finished cake attached thereto, is removed from the press and placed ready for the next operation.

Fifth. The press block, produced as above described, is now divided. The divisions may take the form of sheets, sheeted from the block by a knife; or where rods are to be made, as in the present particular case, the block is cut by a series 5 of open knives 6 of desired shape, and of circular "doughnut shape" if the rods are to be round, traveling through the block, the desired cut rods issuing from the central holes in the knives, one rod from each knife, as will be understood by those skilled in the art. As above emphasized, when the press block contains oriented corpuscular particles, as pearl essence, it is necessary that the knives have a direction of travel through the block other than directly crosswise; and, preferably, the travel is parallel to the direction in which the roughly elliptically shaped corpuscles have their longitudinal axes extending.

As above stated, this provides that all sides of each rod will have a high lustre due to the fact that the "flats" of the particles lie exposed to the eye of the observer. The relation of the diameter of a rod-cutting knife to the total end area of the press block, or more strictly speaking, the relation of such diameter to the number of united bundles which the knife circumscribes, will, of course, vary with circumstances, and the particular results sought. Generally speaking, it is desirable that a knife circumscribe a considerable number of bundles, for example a knife having a central orifice one inch in diameter may desirably circumscribe six or more bundles, in a case where each bundle comprises, say, two "strings" or elementary rods each 1/16 inch in diameter. The principal factor to be considered is that the greater the number of bundles circumscribed by a knife, and the smaller the diameter of the strings in each bundle, the more closely uniform will be the different rods cut by the different knives from the press block. In any case, it is evident that the entire rod delivered by a selected knife will be substantially uniform in mottle throughout its entire length, this length being, of course, the length of the press block.

Due to the described method, wherein it is not attempted to extrude rods with a mottle therein but instead the mottle is arrived at by the laying up of the stock in the cake-press and uniting it into a press block, and wherein also the press block is made up of units having the corpuscular particles fully oriented on all their surfaces, it will be evident that I am able to produce rods, or sheets, having accurately built-up mottles, and with a high lustre throughout their surfaces. In Figure 5 is shown the produced rod 6 with its oriented pearl or the like 7 and repetitive mottle 8. As will be evident, the rods, sheets, or the like, produced may be used for any desired purpose. While cellulouse ester, particularly pyroxylin, plastics have been referred to, it will be evident that the method is applicable to any extrudable and heat-softenable material, as cellulouse acetate, cellulose ether, and starch acetate plastics, and so on.

While the elementary rods, or "shoestrings" have been described as produced by extrusion, since this furnishes a ready means for securing the orientation of the corpuscular particles which it is desired, it will be understood that other methods of producing these elementary rods, as by casting in molds, or flowing from solution, can be used. Furthermore, instead of the usual process of extrusion by an extruding machine, the elementary rods, when it is desired to produce them of exceedingly small diameter, may be produced by "spinning," as is done in the production of artificial silk, since such spinning, being in the last analysis a species of extrusion, will produce strings with the corpuscular particles lying with their "flats" exposed throughout the surface of the string.

While the particular example given combines the features of producing the mottle and of properly orienting the corpuscular pigment, as this results in a particularly valuable product, it will be evident that each feature presents desirable factors in itself. Also, while the production and use of elementary units of plastic in the form of rods of circular cross-section are desirable, it will, of course, be understood that units of other cross-section, as triangular, oval, etc., may be utilized. For example, extruding orifices other than circular may be used in the extruding machine.

I claim:

1. The method of making mottled bodies from plastic material which comprises, intimately assembling units of differently colored plastic into a self-bound longitudinal bundle with the units arranged in correspondence with the desired mottle, stacking a plurality of said bundles, with the bundles lying in substantially the same direction, forming said stack into a block, in the general direction of the longitudinal lie of said bundles as distinguished from perpendicular thereto, and dividing said block into bodies each containing a plurality of said bundles.

2. The method of making mottled bodies from plastic material which comprises, intimately assembling units of differently colored plastic into a self-bound longitudinal bundle with the units arranged in correspondence with the desired mottle, stacking a plurality of said bundles, with the bundles lying in substantially the same direction, forming said stack into a block, in the general direction of the longitudinal lie of said bundles as distinguished from perpendicular thereto, and dividing said block into rod-like bodies each containing a plurality of said bundles.

3. The method of making mottled bodies from plastic material which comprises, intimately assembling units of differently colored plastic into a self-bound longitudinal bundle with the units arranged in correspondence with the desired mottle, stacking a plurality of said bundles, with the bundles lying in substantially the same direction, forming said stack into a block, and dividing said block, in a direction substantially parallel with the axes of said bundles, into rod-like bodies each containing a plurality of said bundles.

4. The method of making bodies, containing corpuscular pigment, from plastic material which comprises, extruding into rod-like units plastic containing corpuscular pigment, thus to provide units with the pigment particles having a directional trend longitudinally of the unit and in whorls about the axis thereof, stacking said units substantially parallel, forming the stack into a block, and dividing the block, substantially parallel with the directional trend of the pigment particles, into bodies of substantially greater cross-sectional area than said units.

5. The method of making, from plastic, mottled bodies containing corpuscular pigment which comprises, adding corpuscular pigment to the plastic, orienting the pigment to give the particles a unidirectional trend, assembling differently colored units of said corpuscular-pigment-containing plastic into bunches, with the units arranged in correspondence with the desired mottle and all lying in substantially the same direction, to give all the corpuscular pigment particles thereof substantially the same direction, stacking said bunches with their axes substantially parallel, forming the stack into a block, and dividing the block in a direction other than directly crosswise of the direction of the lie of the pigment particles.

6. The method of making, from plastic, mottled rods containing corpuscular pigment which comprises, extruding into rod-like units plastic containing corpuscular pigment, thus to provide units with the pigment particles having a directional trend longitudinally of the unit and in whorls about the axis thereof, assembling differently colored units of said corpuscular-pigment-containing plastic into bunches, with the units arranged in correspondence with the desired mottle and all lying in substantially the same direction, to give all the corpuscular pigment particles thereof substantially the same direction, stacking said bunches with their axes substantially parallel, forming the stack into a block, and dividing the block substantially parallel with the directional trend of the pigment particles into rods of substantially greater cross-section than said units.

7. A mottled body having a repetitive mottle therein and therealong with the various units of the mottle substantially uniform.

8. A mottled body in the general character of a rod containing, in addition to coloring matter, corpuscular pigment, and having a repetitive mottle therein and therealong, and also having the corpuscular pigment particles oriented to a substantially unidirectional trend and arranged in whorls about the axis of the body, whereby the entire surface of the body, and section therethrough, exhibits the lustre impartable by oriented corpuscular pigment.

9. A mottled plastic body in the general character of a rod having therein and running in the general direction of the length of the body, a repetitive mottle with the various units of the mottle substantially uniform.

In testimony whereof, I affix my signature.

DANIEL D. PAYNE.

ment which comprises, extruding into rod-like units plastic containing corpuscular pigment, thus to provide units with the pigment particles having a directional trend longitudinally of the unit and in whorls about the axis thereof, assembling differently colored units of said corpuscular-pigment-containing plastic into bunches, with the units arranged in correspondence with the desired mottle and all lying in substantially the same direction, to give all the corpuscular pigment particles thereof substantially the same direction, stacking said bunches with their axes substantially parallel, forming the stack into a block, and dividing the block substantially parallel with the directional trend of the pigment particles into rods of substantially greater cross-section than said units.

7. A mottled body having a repetitive mottle therein and therealong with the various units of the mottle substantially uniform.

8. A mottled body in the general character of a rod containing, in addition to coloring matter, corpuscular pigment, and having a repetitive mottle therein and therealong, and also having the corpuscular pigment particles oriented to a substantially unidirectional trend and arranged in whorls about the axis of the body, whereby the entire surface of the body, and section therethrough, exhibits the lustre impartable by oriented corpuscular pigment.

9. A mottled plastic body in the general character of a rod having therein and running in the general direction of the length of the body, a repetitive mottle with the various units of the mottle substantially uniform.

In testimony whereof, I affix my signature.

DANIEL D. PAYNE.

CERTIFICATE OF CORRECTION.

Patent No. 1,789,081.  Granted January 13, 1931, to

DANIEL D. PAYNE.

It is hereby certified that error appears in the printed specification of the above numbered patent requiring correction as follows: Page 3, lines 65 to 68, claim 1 and lines 73 to 81, claim 2, strike out the words "in the general direction of the longitudinal lie of said bundles as distinguished from perpendicular thereto," and insert the same to follow block lines 68 and 81, claims 1 and 2, respectively; and that the said Letters Patent should be read with these corrections therein that the same may conform to the record of the case in the Patent Office.

Signed and sealed this 24th day of February, A. D. 1931.

(Seal)

M. J. Moore,
Acting Commissioner of Patents.

CERTIFICATE OF CORRECTION.

Patent No. 1,789,081.　　　　　　　　　　　　　　Granted January 13, 1931, to

DANIEL D. PAYNE.

It is hereby certified that error appears in the printed specification of the above numbered patent requiring correction as follows: Page 3, lines 65 to 68, claim 1 and lines 78 to 81, claim 2, strike out the words "in the general direction of the longitudinal lie of said bundles as distinguished from perpendicular thereto," and insert the same to follow block lines 68 and 81, claims 1 and 2, respectively; and that the said Letters Patent should be read with these corrections therein that the same may conform to the record of the case in the Patent Office.

Signed and sealed this 24th day of February, A. D. 1931.

(Seal)

M. J. Moore,
Acting Commissioner of Patents.